US012614778B2

(12) United States Patent
Kim et al.

(10) Patent No.: US 12,614,778 B2
(45) Date of Patent: Apr. 28, 2026

(54) POUCH CELL CUTTING APPARATUS AND POUCH CELL MANUFACTURING METHOD

(71) Applicant: LG Energy Solution, Ltd., Seoul (KR)

(72) Inventors: Ju Hyung Kim, Daejeon (KR); Ji Soo Park, Daejeon (KR); Sin Young Park, Daejeon (KR); Dong Hyeuk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 586 days.

(21) Appl. No.: 17/919,690

(22) PCT Filed: Oct. 18, 2021

(86) PCT No.: PCT/KR2021/014437
§ 371 (c)(1),
(2) Date: Oct. 18, 2022

(87) PCT Pub. No.: WO2022/102998
PCT Pub. Date: May 19, 2022

(65) Prior Publication Data
US 2023/0163379 A1      May 25, 2023

(30) Foreign Application Priority Data

Nov. 12, 2020    (KR) ........................ 10-2020-0151199

(51) Int. Cl.
*H01M 10/647* (2014.01)
*B26F 1/44* (2006.01)
*H01M 50/636* (2021.01)
(52) U.S. Cl.
CPC ............. *H01M 10/647* (2015.04); *B26F 1/44* (2013.01); *H01M 50/636* (2021.01); *B26F 2001/4472* (2013.01)

(58) Field of Classification Search
CPC ..... H01M 10/647; H01M 50/636; B26F 1/44; B26F 2001/4472
See application file for complete search history.

(56) References Cited

U.S. PATENT DOCUMENTS 3,721,144 A * 3/1973 Yamamori ................ B26F 1/44
83/685
2018/0093388 A1     4/2018 Yun et al.
(Continued)

FOREIGN PATENT DOCUMENTS

CN        202678421 U     1/2013
CN        104852014 A     8/2015
(Continued)

OTHER PUBLICATIONS

Extended European Search Report including Written Opinion for Application No. 21892168.2 dated Jun. 19, 2024, pp. 1-9.
(Continued)

*Primary Examiner* — Allison Bourke
*Assistant Examiner* — Verita E Grannum
(74) *Attorney, Agent, or Firm* — Lerner David LLP

(57)        ABSTRACT

A pouch cell cutting apparatus according to an embodiment of the present disclosure, includes a top knife and a bottom knife for cutting a sealing part of a battery cell which includes a cell case and an electrode assembly housed in the cell case, wherein both side parts of the top knife comprises protrusion parts protruding toward the recessed parts formed on both side parts of the bottom knife, respectively, and wherein a corner part of the battery cell is cut by the protrusion part.

5 Claims, 7 Drawing Sheets

(56)  References Cited

U.S. PATENT DOCUMENTS

| | | | |
|---|---|---|---|
| 2023/0001595 A1* | 1/2023 | Kim .......................... | B26D 1/00 |
| 2025/0319622 A1* | 10/2025 | Kim .......................... | B26F 1/44 |

FOREIGN PATENT DOCUMENTS

| | | |
|---|---|---|
| CN | 204538120 U | 8/2015 |
| CN | 205646005 U | 10/2016 |
| CN | 209312886 U | 8/2019 |
| CN | 210282566 U | 4/2020 |
| JP | 6373208 B2 | 8/2018 |
| KR | 20030079101 A | 10/2003 |
| KR | 20140036437 A | 3/2014 |
| KR | 20160026259 A | 3/2016 |
| KR | 20160031208 A | 3/2016 |
| KR | 20160054242 A | 5/2016 |
| KR | 101726783 B1 | 4/2017 |
| KR | 20180037488 A | 4/2018 |
| KR | 101908586 B1 | 10/2018 |
| KR | 20180134162 A | 12/2018 |
| KR | 101974438 B1 | 5/2019 |
| KR | 20190054810 A | 5/2019 |

OTHER PUBLICATIONS

International Search Report for Application No. PCT/KR2021/014437 mailed Jan. 24, 2022, pp. 1-3.

* cited by examiner

【FIG. 1】
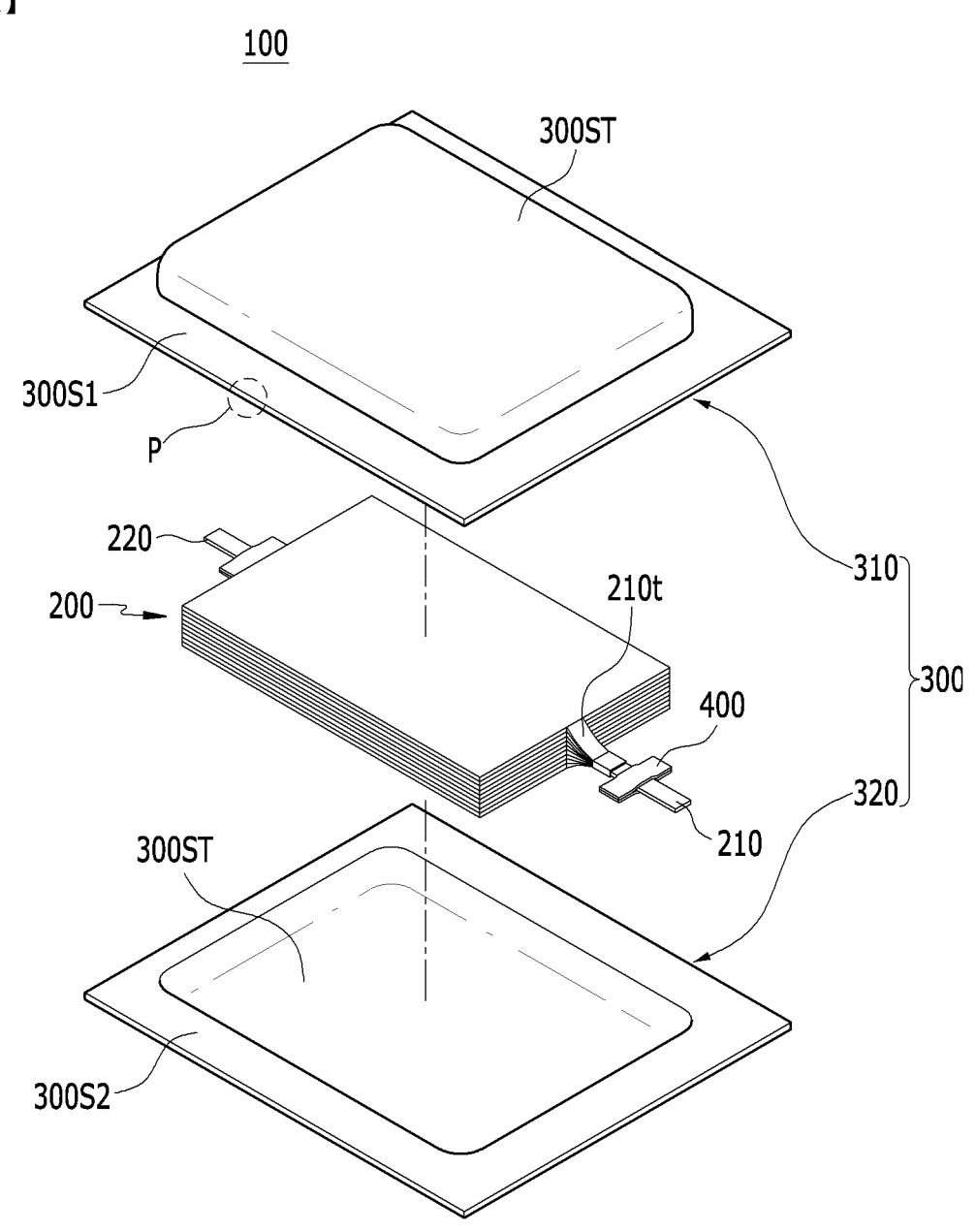

【FIG. 2】
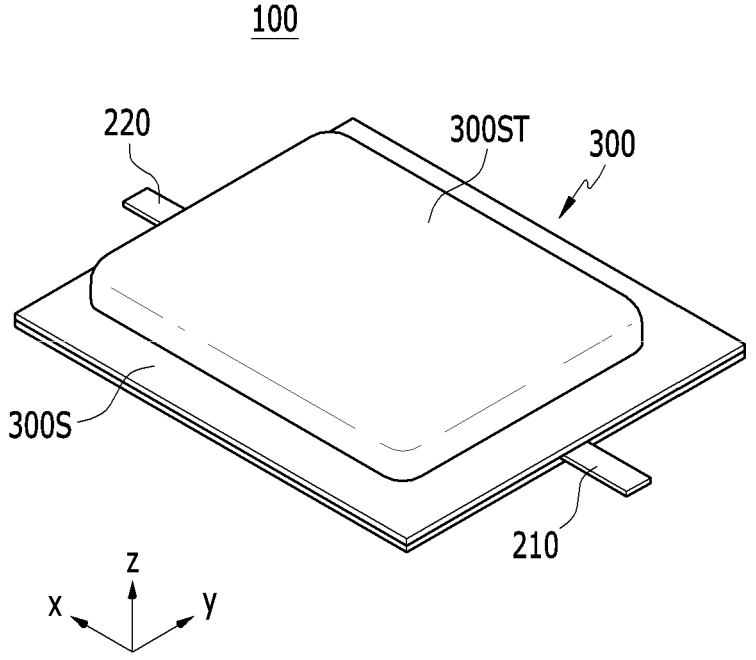
【FIG. 3】
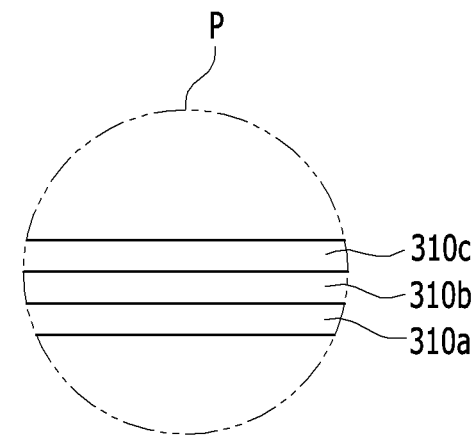

【FIG. 4】
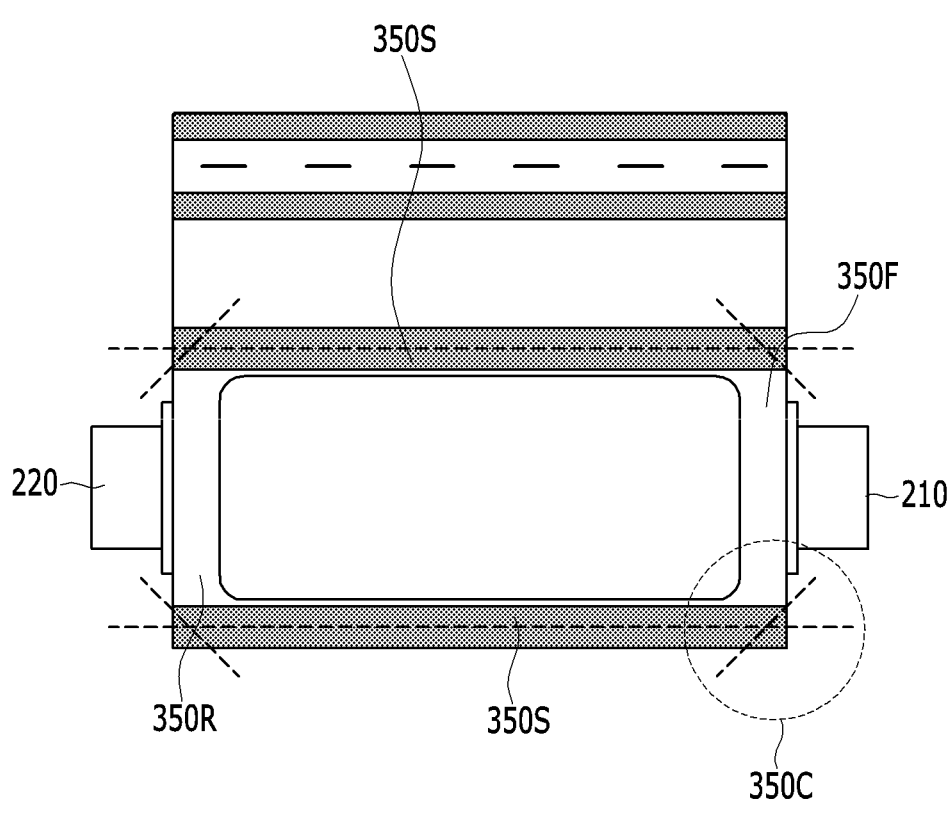

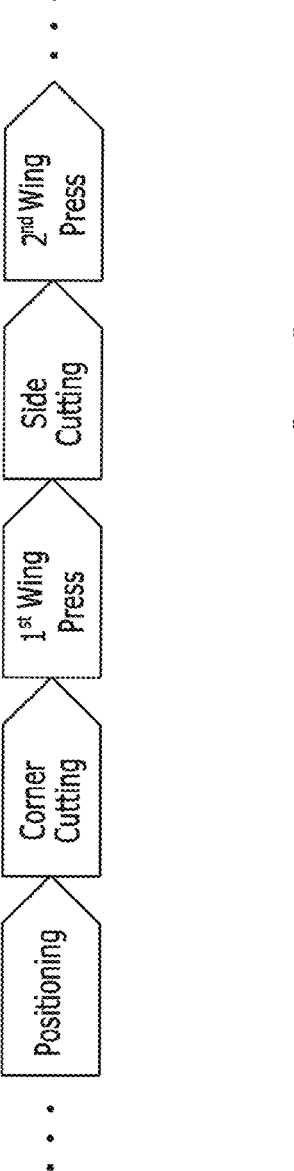
[FIG. 5]

【FIG. 6】
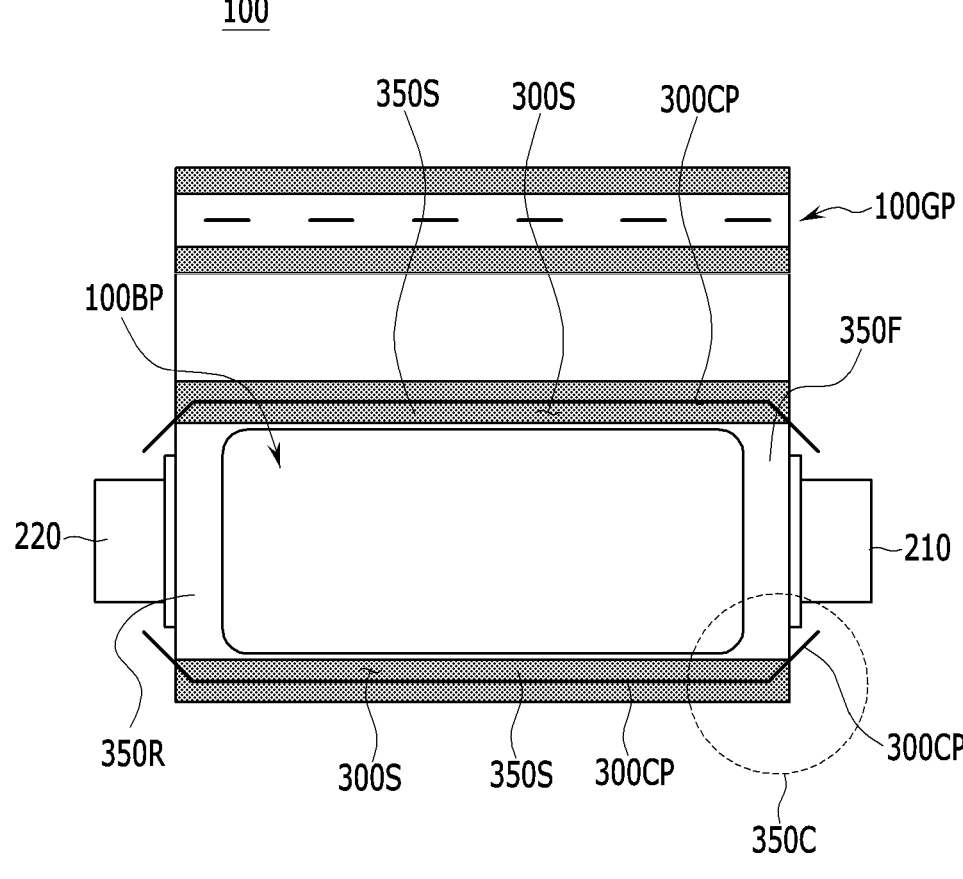

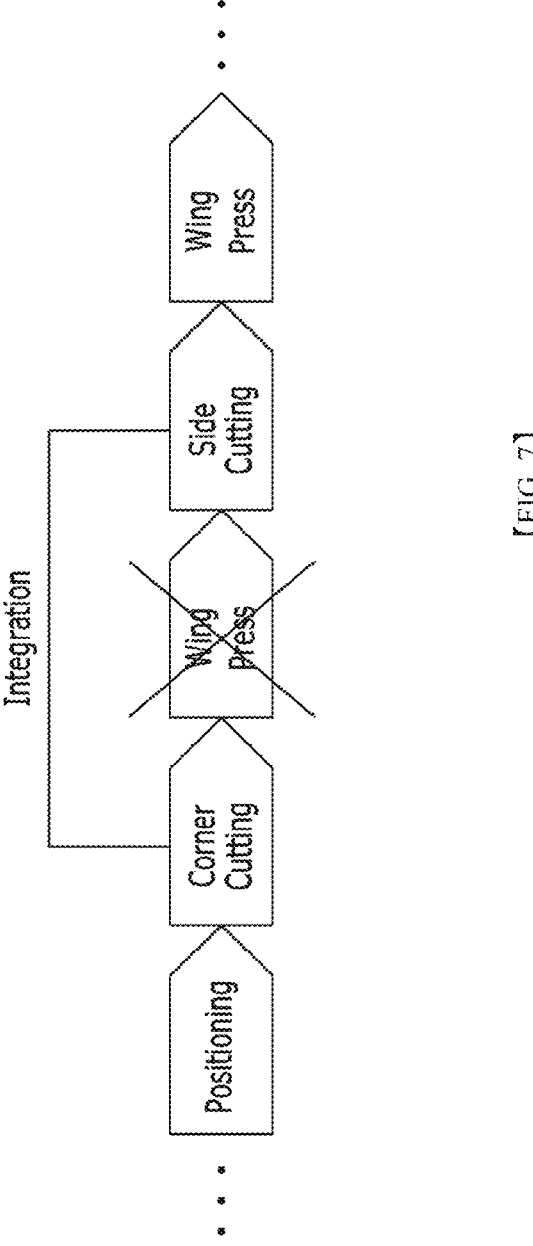
[FIG. 7]

【FIG. 8】
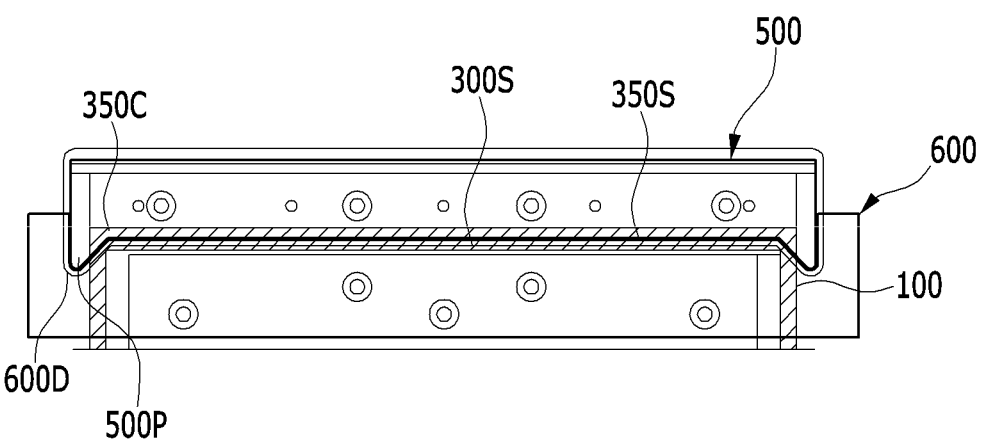

POUCH CELL CUTTING APPARATUS AND POUCH CELL MANUFACTURING METHOD

CROSS-REFERENCE TO RELATED APPLICATIONS

This application is a national stage entry under 35 U.S.C § 371 of International Patent Application No. PCT/KR2021/014437, filed on Oct. 18, 2021, which claims priority to Korean Patent Application No. 10-2020-0151199, filed on Nov. 12, 2020, the disclosures of which are incorporated herein by reference in their entireties.

TECHNICAL FIELD

The present disclosure relates to a pouch cell cutting apparatus and a pouch cell manufacturing method, and more particularly, to a pouch cell cutting apparatus and a pouch cell manufacturing method in which the process has been simplified.

BACKGROUND

Recently, as energy source price is increasing due to the depletion of fossil fuels and increasing interest is being paid to environmental pollution, the demand for environmentally-friendly alternative energy sources is bound to play an important role in the future life. Thus, research into techniques for generating various kinds of power, such as nuclear energy, solar energy, wind energy, and tidal power, is underway, and power storage apparatuses for more efficient use of the generated energy are also drawing much attention.

In particular, as technology development and demands for mobile devices increase, the demand for batteries as energy sources is rapidly increasing. Accordingly, many researches on batteries capable of meeting diverse demands have been conducted.

Typically, the demand for the lithium secondary battery, such as a lithium ion battery or a lithium ion polymer battery, which have advantages such as a high energy density, a discharge voltage, an output stability, and the like is high.

Based on the shape of a battery case, such a secondary battery is classified into a cylindrical battery where an electrode assembly is built into a cylindrical metal can, a prismatic battery where an electrode assembly is built into a prismatic metal can, and a pouch type battery where an electrode assembly is built into a cell case of an aluminum laminate sheet.

In a pouch type secondary battery, a high temperature environment and a large amount of gas generated during a long-term cycle test may cause a vent in the sealing part of the cell case and the electrode lead. For this reason, the safety problem of a secondary battery is emerging. In order to reduce this safety problem, it is necessary to improve the sealing quality of the cell case and the electrode lead.

DETAILED DESCRIPTION OF THE INVENTION

Technical Problem

It is an object of the present disclosure to provide a pouch cell cutting apparatus and a pouch cell manufacturing method in which the process has been simplified.

However, the technical problem to be solved by embodiments of the present disclosure is not limited to the above-described problems, and can be variously expanded within the scope of the technical idea included in the present disclosure.

Technical Solution

According to an embodiment of the present disclosure, there is provided a pouch cell cutting apparatus, comprising: a top knife and a bottom knife for cutting a sealing part of a battery cell which includes a cell case and an electrode assembly housed in the cell case, wherein both side parts of the top knife comprises protrusion parts protruding toward the recessed parts formed on both side parts of the bottom knife, respectively, and wherein a corner part of the battery cell is cut by the protrusion part.

A boundary part between the top knife and the bottom knife corresponds to the sealing part of the battery cell, and a cut part of the battery cell is formed at the boundary part, and a corner part and a side surface part of the battery cell may be simultaneously cut in the cutting part.

A shear angle may be formed in the top knife by the protrusion part, and the corner part of the battery cell may be cut so as to correspond to the shear angle.

The side surface part of the battery cell corresponds to a portion extending in the longitudinal direction of the battery cell, and the electrode lead protruding from the battery cell may be protruded in the longitudinal direction of the battery cell.

The battery cell comprises a cell body part where the electrode assembly is located and a gas pocket part connected to the cell body part, and the cut part may comprise a portion where the cell body part and the gas pocket part are connected.

According to another embodiment of the present disclosure, there is provided a pouch cell manufacturing method, comprising the steps of: housing an electrode assembly in a cell case, injecting an electrolyte solution through a gas pocket part of the cell case, sealing the cell case to form a sealing part, and cutting the sealing part, wherein the step of cutting the sealing part simultaneously cut the corner part and the side surface part of the battery cell.

The pouch cell manufacturing method may further comprise fixing the position of the battery cell, before the step of cutting the sealing part.

The side surface part of the battery cell corresponds to a portion extending in the longitudinal direction of the battery cell, and the electrode lead protruding from the battery cell may be protruded in the longitudinal direction of the battery cell.

The sealing part may comprise a portion that connects the gas pocket part and the cell body part where the electrode assembly is located.

A corner part and a side surface part of the battery cell are simultaneously cut, so that the corner part of the battery cell may form an inclination angle with respect to the side surface part of the battery cell.

Advantageous Effects

According to embodiments of the present disclosure, before side-folding the cell after degassing, the cell, the corner part and the side surface part are cut at the same time without cutting separately, whereby the process can be simplified and the danger of generating scrap or breaking the insulation can be reduced.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view illustrating a pouch type battery cell according to an embodiment of the present disclosure;

FIG. 2 is a perspective view illustrating a state in which the pouch type battery cell of FIG. 1 is assembled;

FIG. 3 is an enlarged cross-sectional view of the region P of FIG. 1;

FIGS. 4 and 5 are views illustrating a pouch cell cutting method according to a comparative example of the present disclosure;

FIGS. 6 and 7 are views illustrating a pouch cell cutting method according to an embodiment of the present disclosure; and FIG. 8 is a view illustrating a pouch cell cutting apparatus according to another embodiment of the present disclosure.

DETAILED DESCRIPTION OF THE
EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 1 is an exploded perspective view illustrating a pouch type battery cell according to an embodiment of the present disclosure. FIG. 2 is a perspective view illustrating a state in which the pouch type battery cell of FIG. 1 is assembled. FIG. 3 is an enlarged cross-sectional view of the region P of FIG. 1.

Referring to FIGS. 1 and 2, the pouch type battery cell 100 according to the present embodiment can be manufactured by housing an electrode assembly 200 inside a cell case 300 and then sealing the cell case. The electrode assembly 200 may include a positive electrode, an negative electrode, and a separator disposed between the positive electrode and the negative electrode. The electrode assembly 200 may be a stack type electrode assembly, a jelly-roll type electrode assembly, or a stack/folding type electrode assembly.

Each of the positive electrode and the negative electrode includes an electrode tab 210*t*, and the electrode leads 210 and 220 each connected to the electrode tab 210*t* may be exposed to the outside of the cell case 300. In addition, the electrode leads 210 and 220 can be located respectively in the sealing part 300S in a state of being covered with a lead film 400 so as to secure a sealing property and an insulation property.

The cell case 300 is composed of a laminate sheet, and may include a resin layer for heat fusion and a metal layer for preventing material penetration. The cell case 300 may include an upper case 310 and a lower case 320.

Specifically, referring to FIG. 3, the upper case 310 may include an inside resin layer 310*a* for sealing, a metal layer 310*b* for preventing material penetration, and an outside resin layer 310*c*.

The layer structure concerning the upper case 310 described above may be equally applied even to a lower case 320. In other words, the lower case 320 may include an inside resin layer, a metal layer and an outside resin layer along a direction away from the electrode assembly 200.

The outside resin layer 310*c* and the packaging sheet layer can have excellent tensile strength and weather resistance compared to their thickness and have electrical insulation property in order to protect the pouch type secondary battery from the outside. The outside resin layer 310*c* may include a polyethylene terephthalate (PET) resin or a nylon resin. The metal layer 310*b* can prevent air, moisture and the like from flowing into the pouch type battery cell 100. The metal layer 310*b* may include aluminum (Al). The inside resin layer 310*a* can be heat-fused to each other by heat and pressure applied in a state where the electrode assembly 200 is built-in. The inside resin layer 310*a* may include casted polypropylene (CPP) or polypropylene (PP).

Referring back to FIGS. 1 and 2, a concave-shaped housing part 300ST on which the electrode assembly 200 can be seated may be formed in each of the upper case 310 and the lower case 320. Sealing parts 300S1 and 300S2 may be provided along the outer periphery of the housing part 300ST for each of the upper case 310 and the lower case 320. The sealing part 300S1 of the upper case 310 and the sealing part 300S2 of the lower case 320 can be heat-fused to each other to form the sealing part 300S and seal the cell case 300.

In another embodiment of the present disclosure, one side of the upper case and one side of the lower case can be integrally connected to each other, and the remaining three sides can be heat-fused.

Meanwhile, each of the plurality of positive electrodes and the plurality of negative electrodes included in the electrode assembly 200 may respectively include a positive electrode tab and an negative electrode tab, to which electrode leads 210 and 220 are connected. Specifically, one of the electrode leads 210 and 220 may be a positive electrode lead, and the other may be an negative electrode lead. As described above, one of the electrode leads 210 and 220 connected to the electrode assembly 200 can protrude from one end part of the cell case 300 and be exposed to the outside of the cell case 300, and the other of the electrode leads 210 and 220 can protrude from the other one end part of the cell case 300 and be exposed to the outside of the cell case 300. In the present embodiment, the structure of the bidirectional electrode leads 210 and 220 has been described, but the electrode leads 210 and 220 can also be protruded in one direction.

Although it is illustrated in FIG. 2 that the corner part of the battery cell 100 have a right-angled shape, the corner part may have an inclined shape by pouch cell cutting described later.

FIGS. 4 and 5 are views illustrating a pouch cell cutting method according to a comparative example of the present disclosure.

Referring to FIG. 4, in the pouch cell cutting method according to the comparative example, the side surface part of the battery cell may be folded after degassing during the pouch cell manufacturing process. Before folding the side surface part of the battery cell, the side surface part 350S and the corner part 350C of the battery cell can be cut. According to the comparative example, the side surface part 350S and the corner part 350C of the battery cell can be cut separately.

When the side surface part 350S and the corner part 350C of the battery cell are separately cut in this way, there is a risk that uncut scrap remains when cutting the corner part 350C. In order to prevent wrinkles and warpage on the cut surface immediately after cutting, there is a troublesome that the wing press step must be performed. Specifically, when the corner part 350C is cut separately, the size of the cut corner part 350C itself is very small, so that the scrap may be very small and the danger of leakage may be higher.

Specifically, referring to FIG. 5, the pouch cell cutting method according to the comparative example may include steps of positioning, corner cutting, 1st wing press, side cutting, and $2^{nd}$ wing press. Here, the positioning step may be the step of properly fixing the position of the battery cell before cutting the battery cell, and the wing press step may be the step of pressing the sealing part of the battery cell with a heating plate.

According to the comparative example, since a large number of wing press steps are performed, there is a risk that the insulation of the edge part of the sealing part is broken.

FIGS. 6 and 7 are views illustrating a pouch cell cutting method according to an embodiment of the present disclosure.

Referring to FIG. 6, the battery cell according to the present embodiment may be a pouch cell configured such that an electrode assembly is housed in a pouch type cell case.

Referring to FIGS. 1, 2 and 6, the pouch cell manufacturing method according to the present embodiment includes the steps of: housing an electrode assembly 200 in a cell case 300, injecting an electrolyte solution through a gas pocket part 100GP of the cell case 300, sealing the cell case 300 to form a sealing part 300S, and cutting the sealing part 300S. Wherein, the step of cutting the sealing part 300S can simultaneously cut the corner part 350C and the side surface part 350S of the battery cell 100.

The sealing part 300S to be cut according to the present embodiment may include a portion that connects the gas pocket part 100GP and the cell body part 100BP where the electrode assembly 200 is located. A cut part 300CP is formed in each side surface part 350S of which the battery cell 100 corresponding to the portion for connecting the gas pocket part 100GP and the cell body part 100BP and the side surface part 350S which is located on one side different from the side surface part 350S. The corner part 350C and the side surface part 350S of the battery cell 100 can be simultaneously cut in the cut part 300CP.

The side surface part 350S of the battery cell 100 according to the present embodiment corresponds to a portion extending in the longitudinal direction of the battery cell 100, and the electrode leads 210 and 220 protruding from the battery cell 100 may be protruded in the longitudinal direction of the battery cell 100. Specifically, the first electrode lead 210 is protruded from the front surface part 350F of the battery cell 100, and the second electrode lead 220 may be protruded from the rear surface part 350R of the battery cell 100. The side surface part 350S of the battery cell 100 is a portion connecting the front surface part 350F and the rear surface part 350R of the battery cell 100, and can correspond to the edge extending along the longitudinal direction of the battery cell 100.

When the side surface part 350S and the corner part 350C of the battery cell are simultaneously cut in this way, it is possible to minimize the risk that uncut scrap remains when cutting the corner part 350C. It is not necessary to add a wing press step between the corner cutting step and the side cutting step in order to prevent wrinkles and warpage on the cut surface, and thus, the process can be simplified.

Specifically, referring to FIG. 7, the pouch cell cutting method according to the present embodiment may include the steps of positioning, simultaneous cutting for corner and side, and wing press. Here, the positioning step may be the step of properly fixing the position of the battery cell before cutting the battery cell, and the wing press step may be the step of pressing the sealing part of the battery cell with a heating plate.

According to the present embodiment, since the number of wing press steps is minimized, it is possible to reduce the risk of breaking the insulation at the edge of the sealing part.

According to the present embodiment, the corner part 350C and the side surface part 350S of the battery cell 100 are simultaneously cut, so that the corner part 350C of the battery cell 100 can form an inclination angle with respect to the side surface part 350S of the battery cell 100.

By cutting the corner part 350C according to the present embodiment, a spiral roller or the like is used to make the sealing part 300S into a double side folded shape in a subsequent step, wherein it is possible to prevent in advance the problem that the battery cell 100 corresponding to the corner part 350C is sagging. The double side folded shape may be a shape formed by folding the sealing part of the cell case at least twice.

Further, by cutting the side surface part 350S according to the present embodiment, it is possible to control the standard for forming the double side folded sealing part.

FIG. 8 is a view illustrating a pouch cell cutting apparatus according to another embodiment of the present disclosure.

Referring to FIG. 8, the pouch cell cutting apparatus according to the present embodiment comprises a top knife 500 and a bottom knife 600 for cutting a sealing part 300S of a battery cell 100 which includes a cell case and an electrode assembly housed in the cell case, wherein both side parts of the top knife 500 comprises protrusion parts 500P protruding toward the recessed parts 600D formed on both side parts of the bottom knife 600, respectively. Wherein, a corner part 350C of the battery cell 100 is cut by the protrusion part 500P. The length of the top knife may be shorter than the length of the bottom knife.

A boundary part between the top knife 500 and the bottom knife 600 corresponds to the sealing part 300S of the battery cell 100, and a cut part of the battery cell 100 may be formed at the boundary part. A corner part 350C and a side surface part 350S of the battery cell 100 may be simultaneously cut in the cutting part.

A shear angle is formed in the top knife 500 by the protrusion part 500P, and the corner part 350C of the battery cell 100 may be cut so as to correspond to the shear angle.

Meanwhile, several pouch type battery cells according to an embodiment of the present disclosure can be gathered to constitute a battery module, and one or more battery modules can be packaged in a pack case to form a battery pack.

The above-mentioned battery module and battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described above with reference to the preferred embodiments, the scope of the present disclosure is not limited thereto, and numerous other variations and modifications can be devised by those skilled in the art using the principles of the invention described in the appended claims, which will also fall within the spirit and scope of the present disclosure.

DESCRIPTION OF REFERENCE NUMERALS

100: battery cell
100BP: cell body part
100GP: gas pocket part
300: cell case
300S: sealing part
300CP: cut part
350C: corner part
350S: side surface part
500: top knife
500P: protrusion part
600: bottom knife
The invention claimed is:

1. A pouch cell cutting apparatus, comprising:
a top knife and a bottom knife together configured to cut a sealing part of a battery cell which includes a cell case and an electrode assembly housed in the cell case,
wherein the top knife has a cutting edge configured to cut the sealing part of the battery cell, wherein the cutting edge of the top knife has a central recessed part extending in a longitudinal direction, the central recessed part extending between first and second opposite side parts of the cutting edge of the top knife, the first and second opposite side parts being protrusion parts that extend from the central recessed part at first and second inclination angles relative to the central recessed part, the protrusion parts having shapes that are complementary to shapes of first and second recessed parts of a cutting edge of the bottom knife, and
wherein the protrusion parts are configured to cut first and second corner parts at opposite ends of a side surface part of the sealing part of the battery cell at the first and second inclination angles, and the central recessed part is configured to cut the side surface part of the battery cell, the pouch cell cutting apparatus being configured to simultaneously cut the first and second corner parts and the side surface part of the battery cell.

2. The pouch cell cutting apparatus according to claim 1, wherein:
a boundary part between the top knife and the bottom knife is configured to cut the sealing part of the battery cell, and the apparatus is configured to form a cut part of the battery cell at the boundary part.

3. The pouch cell cutting apparatus according to claim 2, wherein:
A shear angle is formed in the top knife by the protrusion part, and the top knife is configured to cut the first and second corner parts of the battery cell at the shear angle relative to the side surface part.

4. The pouch cell cutting apparatus according to claim 2, wherein:
the side surface part of the battery cell extends in a longitudinal direction of the battery cell, and an electrode lead protruding from the battery cell extends in the longitudinal direction of the battery cell.

5. The pouch cell cutting apparatus according to claim 2, wherein:
the battery cell comprises a cell body part where the electrode assembly is located and a gas pocket part connected to the cell body part, and
the cut part comprises a portion where the cell body part and the gas pocket part are connected.

\* \* \* \* \*